Sept. 25, 1956        A. N. WELLS        2,764,002
FLEXIBLE COUPLING
Filed May 1, 1953
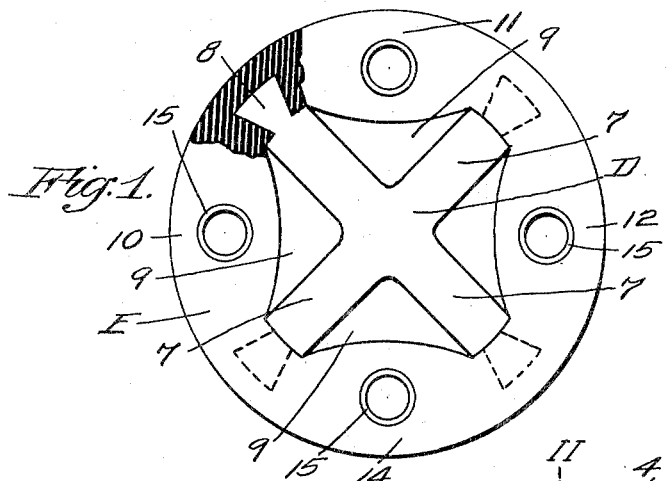
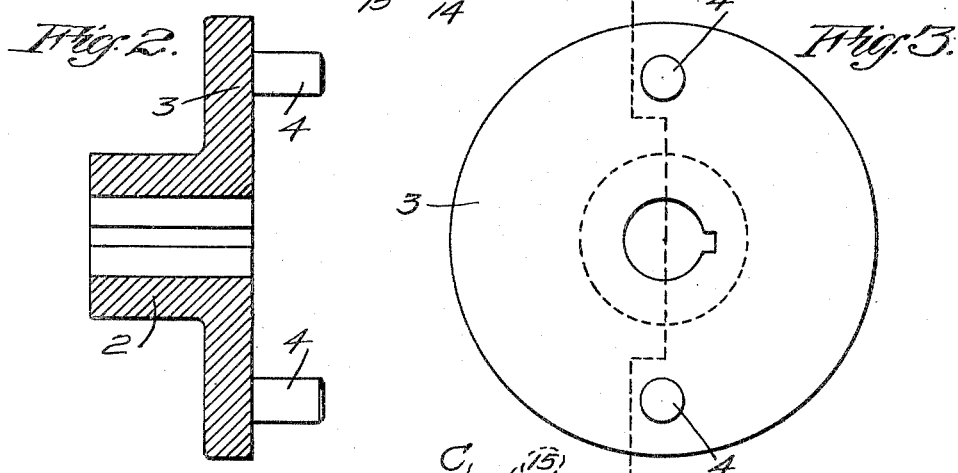
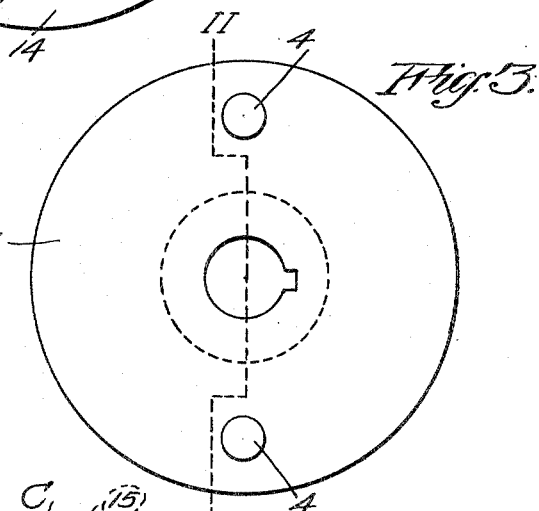
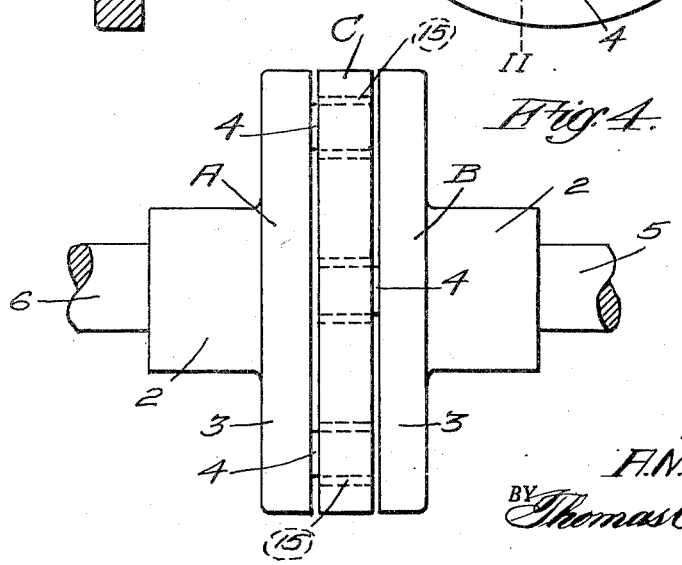
INVENTOR.
F. N. WELLS.
BY Thomas Castberg
Atty.

United States Patent Office 2,764,002
Patented Sept. 25, 1956

2,764,002
FLEXIBLE COUPLING
Arthur N. Wells, Belmont, Calif.
Application May 1, 1953, Serial No. 352,393
2 Claims. (Cl. 64—13)

This invention relates in general to shaft couplings and more particularly to that type of couplings known as flexible couplings.

In flexible couplings it is general practice to provide two flanged hubs for mounting respectively upon the adjacent ends of a driving and a driven shaft, and connecting the flanges by an interposed flexible disks or disks made of rubber, fabric, leather or a like material. Disks of this character are not too satisfactory as they are readily damaged by sudden application of torque, excess flexing due to misalignment of the shafts and stretching of the material beyond its factor of resistance.

The object of the present invention is generally to improve and simplify the construction and operation of flexible couplings; to provide a flexible coupling wherein greater flexibility and longer life are obtained when placed between misaligned shafts; to provide a flexible coupling capable of effectively absorbing shock loads caused by sudden application in a forward or reversed direction; and further to provide a coupling construction which compensates for misalignment of shafts without introducing excessive stresses and undue wear.

The coupling is shown by way of illustration in the accompanying drawing in which, Fig. 1 is a face view of the intermediate flexible coupling disk, said view being partly broken away and shown in section.

Fig. 2 is a section taken on line II—II fig. 3.

Fig. 3 is a face or end view of one of the flanged hubs, and

Fig. 4 is a side elevation of the assembled flexible coupling.

Referring to the drawings in detail and particularly Fig. 4, A and B indicate a pair of flanged hub members and C an intermediate flexible coupling disk which forms the subject matter of the invention. The flanged hubs are of standard construction, each consisting of a hub 2 and an integral flange or disk 3 from the face of which projects pins 4 spaced apart 180 degrees. One of the flanged hubs is secured by a key or similar means to the end of a drive shaft 5 while the other flanged hub is secured to the adjacent end of a driven shaft 6. The flexible coupling disk C interposed between them is best shown in Fig. 1. It consists broadly of an inner rigid member D and an outer flexible and resilient member E. The rigid member may be made of any suitable metal or hard, tough plastic or a like material. It is cross-shaped in that it consists of four radially extending connected arms 7 disposed at right angles to each other. The outer flexible resilient member is composed of rubber or a like material, and is secured to the outer ends of the arms in any suitable manner or as here shown by wedge-shaped members 8 which become imbedded in the rubber when it is molded and vulcanized in place.

The resilient member is substantially ring-shaped as it spans or connects the outer ends of the rigid arms only, leaving open spaces 9 between the arms, further, the resilient member is to all practical purposes divided into four sections indicated at 10, 11, 12 and 14 by the securing members 8, that is, each section of the ring-shaped resilient member whether it be one section or another is interposed between the outer ends of a pair of rigid arms, thus forming an elongated spanning member rigidly supported and secured at opposite ends, but free to yield particularly at a point midway of its ends, this is of great importance, as each resilient section carries a pin bushing 15 midway between its ends into which the pins 4 of the flanged hubs extend when the coupling is assembled as shown in Fig. 4.

As the resilient members spanning or connecting the outer ends of the rigid arms are made of rubber or a like resilient and flexible material, it can be readily seen that due to their length they are compressible to a degree in an end-wise direction, thus absorbing and cushioning suddenly applied torque loads whether in a forward or reversed direction, also due to resiliency and length a maximum of radial and angular movement of the pins and bushings is permitted when two shafts are misaligned.

The intermediate disk or coupling member is simple in construction and readily placed in position between the flanged hubs when they are assembled, and due to the shape and position of the resilient members a maximum of resiliency and flexing is insured without causing undue wear or over-stressing of the resilient material.

Having thus described my invention what I desire to claim and secure by Letters Patent is,

1. A flexible coupling comprising a pair of flanged hubs having opposed flange faces disposed in spaced relation, a coupling member disposed between said faces, said coupling member including a rigid crosspiece having four equally spaced radial arms, each of said arms terminating in a radially extending anchoring member, a resilient, generally annular ring disposed in coplanar relation with said arms with only said anchoring members fixedly embedded therein, the inner edge of said ring intersecting said arms only adjacent the ends thereof so as to form open areas defined by adjacent side of the arms and the inner edge portions of the ring extending therebetween to allow for radial inward deflection, said ring having a transverse opening disposed between each adjacent pair of anchoring members, and each flange face having a pair of diametrically opposed, parallel pins projecting therefrom received in a corresponding pair of said openings.

2. A flexible coupling comprising a pair of flanged hubs having opposed flange faces disposed in spaced relation, a coupling member disposed between said faces, said coupling member including a rigid crosspiece having four equally spaced radial arms, each of said arms terminating in a radially extending anchoring member, and each of said anchoring members having outwardly diverging opposite sides, a resilient, generally annular ring disposed in coplanar relation with said arms with only said anchoring members fixedly embedded therein, the inner edge of said ring intersecting said arms only adjacent the ends thereof so as to form open areas defined by adjacent sides of the arms and the inner edge portions of the ring extending therebetween to allow for radial inward deflection, said ring having a transverse opening disposed between each adjacent pair of anchoring members, and each flange face having a pair of diametrically opposed, parallel pins projecting therefrom received in a corresponding pair of said openings.

References Cited in the file of this patent

UNITED STATES PATENTS

| 2,101,078 | Lord et al. | Dec. 7, 1937 |
| 2,417,436 | Natkins | Mar. 18, 1947 |

FOREIGN PATENTS

| 176,525 | Switzerland | July 1, 1935 |